US012130128B2

(12) United States Patent
Liang et al.

(10) Patent No.: US 12,130,128 B2
(45) Date of Patent: Oct. 29, 2024

(54) DEVICE AND METHOD FOR MEASURING CURVATURE RADIUS

(71) Applicant: SHENZHEN SUPRO INSTRUMENTS LIMITED, Guangdong (CN)

(72) Inventors: Kai Liang, Shenzhen (CN); Xiaobo Zhang, Shenzhen (CN); Zhengkai Chang, Shenzhen (CN)

(73) Assignee: SHENZHEN SUPRO INSTRUMENTS LIMITED, Guangdong (CN)

( * ) Notice: Subject to any disclaimer, the term of this patent is extended or adjusted under 35 U.S.C. 154(b) by 124 days.

(21) Appl. No.: 17/797,625

(22) PCT Filed: Jan. 15, 2020

(86) PCT No.: PCT/CN2020/072313
§ 371 (c)(1),
(2) Date: Aug. 4, 2022

(87) PCT Pub. No.: WO2021/128517
PCT Pub. Date: Jul. 1, 2021

(65) Prior Publication Data
US 2023/0054161 A1    Feb. 23, 2023

(30) Foreign Application Priority Data

Dec. 23, 2019  (CN) .......................... 201911338140.9
Dec. 23, 2019  (CN) .......................... 201922329358.X

(51) Int. Cl.
*G01B 11/255*    (2006.01)

(52) U.S. Cl.
CPC ................... *G01B 11/255* (2013.01)

(58) Field of Classification Search
CPC ........ G01B 11/24; G01B 11/25; G01B 11/255
See application file for complete search history.

(56) References Cited

U.S. PATENT DOCUMENTS 5,912,738 A * 6/1999 Chason ................ G01B 11/255
356/601
7,391,523 B1 * 6/2008 Taylor, II ........... G01B 11/2522
356/612
(Continued)

FOREIGN PATENT DOCUMENTS

CN    101034034 A    9/2007
CN    104655053 A    5/2015
(Continued)

OTHER PUBLICATIONS

International Search Report and Written Opinion mailed Sep. 28, 2020 received in PCT/CN2020/072313.
(Continued)

*Primary Examiner* — Uzma Alam
*Assistant Examiner* — Justin J Van Cleave
(74) *Attorney, Agent, or Firm* — Dorsey & Whitney LLP

(57) ABSTRACT

A device for measuring a curvature radius includes a sample stage configured to support a sample to be measured, a diffracted light array generation module configured to generate and emit a diffracted light array to the sample, and a detection and analysis module configured to receive a reflected light array emitted from the sample and to obtain the curvature radius of the sample according to a dimension of the received reflected light array. Also disclosed is a method for measuring the curvature radius.

15 Claims, 5 Drawing Sheets

(56) References Cited

U.S. PATENT DOCUMENTS

| | | | |
|---|---|---|---|
| 2008/0186512 A1* | 8/2008 | Kee | G01B 11/25 356/615 |
| 2014/0168370 A1* | 6/2014 | Heidemann | G01B 11/2518 348/46 |
| 2015/0276388 A1* | 10/2015 | Akita | G01B 11/255 356/364 |
| 2018/0052115 A1 | 2/2018 | Chen et al. | |

FOREIGN PATENT DOCUMENTS

| | | |
|---|---|---|
| CN | 107121095 A | 9/2017 |
| CN | 110567393 A | 12/2019 |
| CN | 211121098 U | 7/2020 |
| SU | 1770738 A1 | 10/1992 |
| WO | 2018183153 A1 | 10/2018 |

OTHER PUBLICATIONS

First Office Action for Chinese Application No. 201911338140.9 mailed Aug. 17, 2024.

\* cited by examiner

DEVICE AND METHOD FOR MEASURING CURVATURE RADIUS

CROSS-REFERENCE TO RELATED DISCLOSURES

This application is a U.S. national stage application of PCT international application PCT/CN2020/072313, filed on Jan. 15, 2020, which claims priority to Chinese patent application No. 2019113381409 filed on Dec. 23, 2019, entitled "DEVICE AND METHOD FOR MEASURING CURVATURE RADIUS", and claims priority to Chinese patent application No. 201922329358X, entitled "DEVICE FOR MEASURING CURVATURE RADIUS" filed on Dec. 23, 2019, the entire contents of each which are incorporated herein by reference.

TECHNICAL FIELD

The present disclosure relates to the technology of thin film measurement, and in particular to a device for measuring a curvature radius and a method for measuring a curvature radius.

BACKGROUND

What described herein is background information related to the present disclosure and may not necessarily constitute the prior art.

Thin film technologies are widely applied in the technical fields of optics, electrics, materials, and the like. However, a relatively large residual stress may exist in a formed thin film during the preparation of the thin film by using a physical vapor deposition process or other preparation processes, and the residual stress may cause a bent film or even a device failure. A curvature radius of the thin film is the most direct measurement for evaluating the residual stress. Therefore, after the thin film is formed, measuring the curvature radius of the thin film is a key thin film measurement process.

A single spot line scanning method is a mature method for measuring a curvature radius of a thin film. A measuring beam is reflected by a surface of a deformed sample, then an optical path of the measuring beam is magnified, and an offset location is acquired for computing an equivalent curvature radius of the sample. However, the single spot line scanning method requires to measure a plurality of groups (usually greater than 10 groups) of data for computing the curvature radius of the thin film, and a single measuring time is greater than 20 seconds. What's more, multiple groups of measurement data are easily interfered by environmental vibration, thereby affecting the measurement result.

In order to solve the problems of measuring time and accuracy of the single spot line scanning method, researchers have proposed a parallel light array method, by changing the measuring beam into a parallel light array, the curvature radius of the sample may be computed by data sampled once, and the effect of environmental interference on the measurement accuracy can be avoided. However, in the parallel light array method, a high-quality parallel light spot array is required, which has high requirements for a design of an optical device. An optical device, Etalon, is usually set up to generate the parallel light array, but has high manufacturing cost. In addition, brightness of an end of a beam is relatively low, thus resulting in higher requirements for intensity of a laser, sensitivity of a sensor and reflectivity of a surface of the sample.

SUMMARY

According to some embodiments of the present disclosure, a device for measuring a curvature radius and a method for measuring a curvature radius are provided.

The device for measuring the curvature radius includes a sample stage, a diffracted light array generation module, and a detection and analysis module. The sample stage is configured to support a sample to be measured, the diffracted light array generation module is configured to generate and emit a diffracted light array to the sample, and the detection and analysis module is configured to receive a reflected light array emitted from the sample and to obtain a curvature radius of the sample according to a dimension of a received reflected light array.

In some embodiments, the detection and analysis module includes a sensor imaging screen and an analysis unit; the sensor imaging screen is configured to receive the reflected light array emitted from the sample and to convert an optical signal of the reflected light array into an electrical signal; and the analysis unit is electrically connected to the sensor imaging screen and configured to obtain the curvature radius of the sample according to the electrical signal.

In some embodiments, an emitting direction of the diffracted light array is perpendicular to the sample stage, and the curvature radius of the sample is obtained according to a following formula:

$$R = \frac{2HS(\sec\beta)^2 \tan\beta + 2DS(\tan\beta)^2 + \sqrt{4D^2S^2(\tan\beta)^2 + [2HS(\sec\beta)^2 \tan\beta + 2DS(\tan\beta)^2]^2}}{2D}$$

wherein, R denotes the curvature radius of the sample; S denotes a length of a first path of the diffracted light array from the diffracted light array generation module to a surface of the sample; H denotes a length of a second path of the reflected light array from the surface of the sample to the sensor imaging screen; R denotes a divergence angle of the diffracted light array; D denotes a distance between an actual landing point and a preset landing point of the reflected light array on a detector.

In some embodiments, the device for measuring the curvature radius further includes a semi-reflecting and semi-transmitting lens disposed between the diffracted light array generation module and the sample stage, an included angle between the semi-reflecting and semi-transmitting lens and the sample stage is 45°; the semi-reflecting and semi-transmitting lens is configured in such a manner that the diffracted light array passes through the semi-reflecting and semi-transmitting lens, reaches the surface of the sample, and is reflected by the surface of the sample and the semi-reflecting and semi-transmitting lens, and is projected onto the sensor imaging screen perpendicular to the sample stage.

In some embodiments, the sample stage includes a table board and a two-dimensional movement mechanism; the table board is configured to support the sample to be measured; and the two-dimensional movement mechanism, configured to drive the table board to move horizontally.

In some embodiments, the diffracted light array generation module includes a laser and a diffractive optical lens; the laser is configured to emit an initial detection light beam; the diffractive optical lens is configured to convert the initial detection light beam into a diffracted light array.

In some embodiments, the method for measuring the curvature radius, including: placing a sample on a sample stage, emitting a diffracted light array to a surface of the sample, receiving a reflected light array emitted from the sample, and obtaining a single-point curvature radius of the sample according to the reflected light array.

In some embodiments, before the placing the sample on the sample stage, the method further includes: calibrating mechanical parameters of a device for measuring the curvature radius.

In some embodiments, the calibrating the mechanical parameters of the device for measuring the curvature radius includes: placing a first calibration film on the sample stage, emitting the diffracted light array to a surface of the first calibration film, receiving a first reflected light array emitted from the first calibration film, replacing the first calibration film with a second calibration film, and repeating the steps of emitting the diffracted light array and receiving the reflected light array to obtain a second reflected light array, obtaining calibrated data of the mechanical parameter of the device for measuring the curvature radius measurement according to the first reflected light array, the second reflective light array, a curvature radius of the first calibration film and a curvature radius of the second calibration film; and importing the calibrated data to an analysis unit.

In some embodiments, after the step of obtaining the single-point curvature radius, the method further includes: moving the sample stage in a preset direction and at a preset step length, emitting a diffracted light array to the surface of the sample, receiving a reflected light array emitted from the sample, obtaining a single-point curvature radius of a current position of the sample according to the reflected light array, and determining whether the current position is a final position; responsive to the current position being the final position, ending the measurement process and outputting curvature radii of multiple points of the sample; and responsive to the current position not being the final position, repeating steps of moving the sample stage, emitting the diffracted light array, and receiving the reflected light array to obtain the curvature radius of a next position of the sample.

In some embodiments, after the obtaining the curvature radii of multiple points of the sample, the method further includes: drawing a distribution diagram of curvature radii of the sample according to the curvature radii of multiple points.

The details of one or more embodiments of the present disclosure are described in the accompanying drawings and specification below. Other features, objectives, and advantages of the present disclosure will be obvious from the specification, the drawings and the claims.

BRIEF DESCRIPTION OF THE DRAWINGS

In order to illustrate technical solutions more clearly in the embodiments or exemplary technologies of the present disclosure, the drawings required for the description of the embodiments or exemplary technologies will be briefly described below. It is obvious that the drawings in the following description are merely embodiments of the present disclosure. For those of ordinary skill in the art, without creative efforts, other drawings may also be obtained according to the attached drawings.

DETAILED DESCRIPTION

To make the objectives, technical solutions and advantages of the present disclosure clearer and better understood, the present disclosure is further described in detail below based on the embodiments combining with the accompanying drawings. It should be understood that the specific embodiments described herein are merely used to explain the present disclosure, but not intended to limit the present disclosure.

In the description of the present disclosure, it should be understood that orientations or positional relationships indicated by terms such as "center", "lateral", "upper", "lower", "left", "right", "vertical", "horizontal", "top", "bottom", "inside", "outside" and others are based on the orientations or positional relationships shown in the accompanying drawings, and are merely for the convenience of describing the present disclosure and simplifying the description, rather than indicating or implying that the device or element referred to must have a specific orientation, be constructed and operate in a specific orientation, and therefore should not be deemed as a limitation on the present disclosure. Furthermore, it should be noted that when an element is referred to be "formed on" another element, it may be directly formed on another element or intervening elements may also be present. When an element is "connected" to another element, it may be directly connected to another element or intervening elements may also be present. In contrast, when an element is referred to be "directly on" another element, no intervening element is provided.

An embodiment of the present disclosure provides a device for measuring a curvature radius, including a sample stage 100, a diffracted light array generation module 200, and a detection and analysis module. The sample stage 100 is configured to support a sample to be measured. The diffracted light array generation module 200 is configured to generate and emit a diffracted light array to the sample. The detection and analysis module is configured to receive a reflected light array emitted from the sample, and to obtain a curvature radius of the sample according to a dimension of a received reflected light array.

Figure 1:
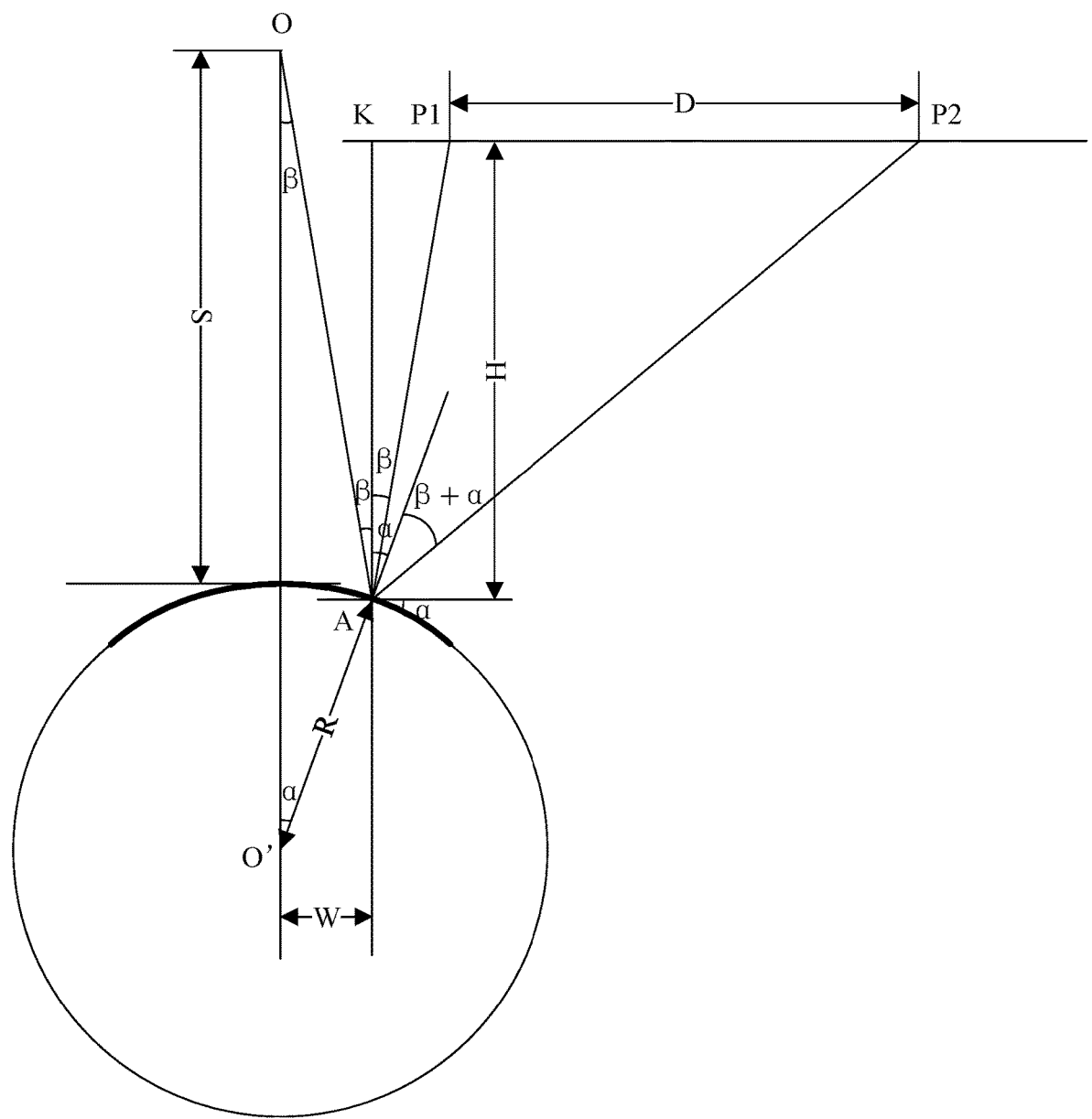
FIG. 1 is a schematic diagram of a calculation model of a device for measuring a curvature radius according to an embodiment.

FIG. 1 is a schematic diagram of a calculation model of a device for measuring a curvature radius according to an embodiment. The diffracted light array is emitted from a light source point O to reach a surface of a sample (the surface of the sample being illustrated as a thicker and solid line in FIG. 1), and is further reflected by the surface of the sample to emit a reflected light array to a light receiving plane.

In the present calculation model, it is assumed that the diffracted light array includes two light rays, of which one light ray having an emitting direction perpendicular to a tangential direction of a point to be measured on the surface of the sample is defined as a first light ray, and the other light ray with an emitting direction different from that of the first light ray is defined as a second light ray. The second light ray irradiates a point A on the surface of the sample, β denotes an angle between the first light ray and the second light ray, α denotes an angle between lines O'A and O'O (O' denotes a center of a virtual circle where the sample is located, and a radius of the virtual circle is a curvature radius R of the sample). First, assuming that the curvature radius of the thin film sample is infinite, i.e., the sample is a plane without curvature, then a preset landing point of the reflected light ray of the second light on the light receiving plane may be P1. However, since an actual curvature radius of the thin film sample is not infinite, an actual landing point of the reflected light ray on the light receiving plane may be P2, and there is a certain deviation distance D between the locations of P1 and P2. Furthermore, S is defined as a distance from the light source point O to the surface of the sample, H is defined as a vertical distance from a point A of the surface of the sample to the light receiving plane, and W denotes a vertical distance from the point A to line O'O. The parameters α, β, R, D, S, H and W satisfy the following formulas:

$$D = KP2 - KP1 = H \tan(2\alpha + \beta) - H \tan(\beta) \quad (1)$$

$$\sin(\alpha) = \frac{W}{R} \quad (2)$$

In addition, the curvature radius of a bent sample caused in the thin film deposition process is generally greater than 5 m, and a distance between the landing point of the first light ray and the landing point of the second light ray on the surface of the sample is not greater than 5 mm, thus the following approximate formula can be obtained.

$$W \approx S \tan(\beta) \quad (3)$$

$$\cos(\alpha) \approx 1 \quad (4)$$

The following calculation formula of the curvature radius can be obtained by solving the formula (1) to formula (4):

$$R = \frac{2HS(\sec\beta)^2 \tan\beta + 2DS(\tan\beta)^2 + \sqrt{4D^2S^2(\tan\beta)^2 + [2HS(\sec\beta)^2 \tan\beta + 2DS(\tan\beta)^2]^2}}{2D}$$

Further, on the premise that the curvature radius of the sample is usually greater than 5 m, and that a distance between locations of the first light ray and the second light ray irradiating on the surface of the sample is not greater than 5 mm, a clearance between the sample and the sample stage 100 is extremely small, S can be approximately equal to a distance from the light source point O to the surface of the sample stage 100, H can be approximately equal to a distance between the surface of the sample stage 100 to the light receiving plane, therefore, S and H may be considered as intrinsic mechanical parameters of the device for measuring the curvature radius. In addition, p denotes a divergence angle of the diffracted light array, thus R is an inherent optical parameter of the diffracted light array. That is, the parameters S, H and R in the calculation formula of the curvature radius are known quantities, and the curvature radius R of the sample can be obtained by using the calculation formula of the curvature radius based on a measurement result of the deviation distance D.

According to the calculation formula of the curvature radius, it is known that based on the present calculation model, the curvature radius of a single point on the sample surface can be obtained by only one measurement, without a necessity of obtaining multiple groups of data measured continuously, which avoids the influences of vibration and other disturbances on the different groups of measured data, thereby achieving a measurement model with a faster measuring speed and a more accurate result.

In an embodiment, the detection and analysis module includes a sensor imaging screen 310 and an analysis unit. The sensor imaging screen 310 is configured to receive a reflected light array emitted from the sample, and convert an optical signal of the reflected light array into an electrical signal. The analysis unit is electrically connected to the sensor imaging screen 310 and configured to obtain the curvature radius of the sample according to the electrical signal.

Figure 2:
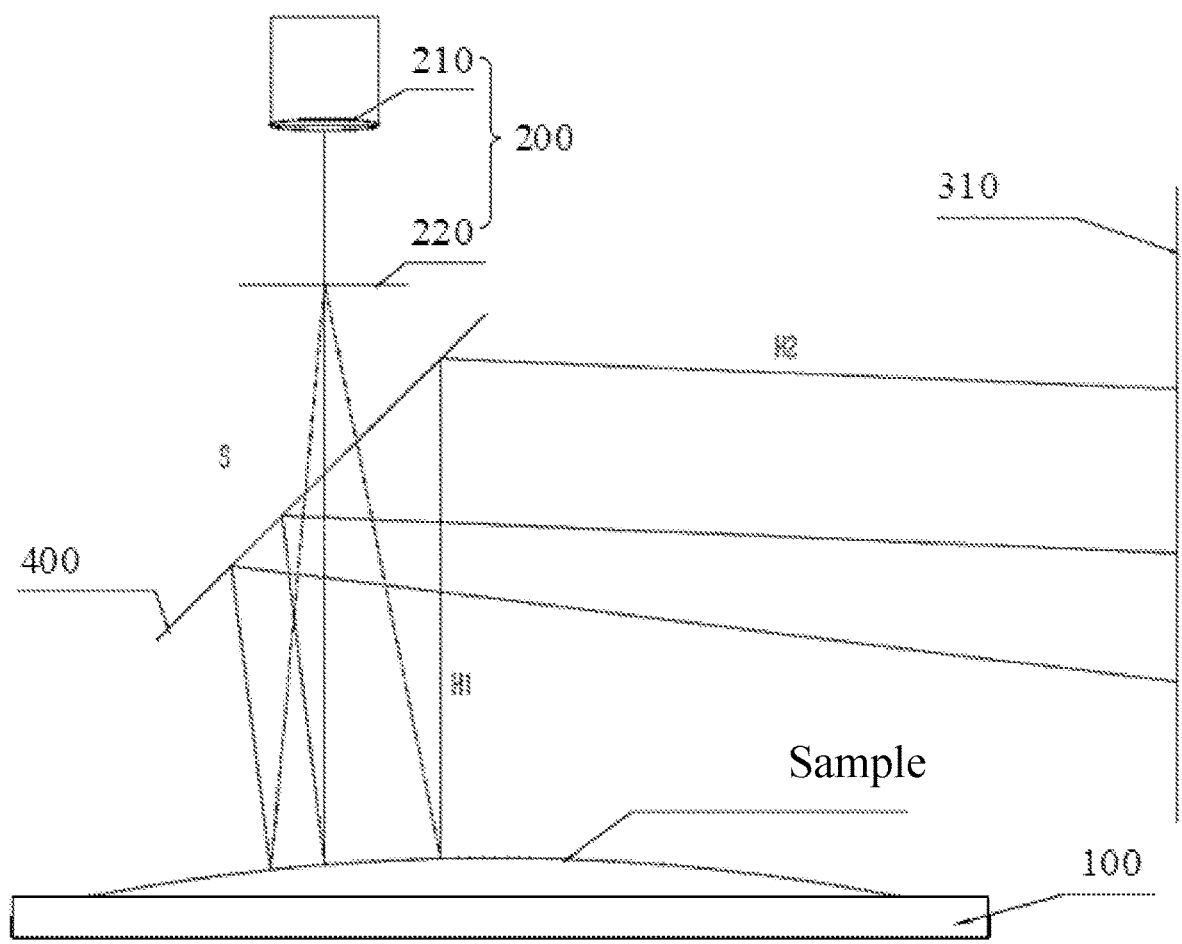
FIG. 2 is a schematic structural diagram illustrating the device for measuring the curvature radius according to an embodiment.

As shown in FIG. 2, the sensor imaging screen 310 is the light receiving plane above, and the analysis unit is a data processing device, such as a computer (not shown in the figure), electrically connected to the sensor imaging screen 310. In an embodiment, the sensor imaging screen 310 includes a charge coupled device (CCD) image sensor with a measurement precision of 10 um, that is, the CCD image sensor can distinguish two light rays with a distance between two landing points not less than 10 um, which can accurately measure a reflected light array with a distance between adjacent light spots not less than 10 um. After obtaining the reflected light array, the sensor imaging screen 310 sends the electrical signal to the analysis unit, and the analysis unit obtains the curvature radius of the sample according to the calculation formula of the curvature radius.

In this embodiment, both H and S of the device for measuring the curvature radius are less than 1 m, and by using the sensor imaging screen 310 with the measurement accuracy of 10 um, the device for measuring the curvature radius of the embodiment can be configured to measure a sample having a curvature radius ranging from 5 m to 200 m, and a system error is within a range from −1% to +1%. Further, corresponding H and S may be selected according to the curvature radius of the sample, for example, when the curvature radius is relatively large, a larger distance H from the sample to the sensor imaging screen 310 is selected, thereby amplifying the reflected light array and obtaining a more accurate measurement result.

In an embodiment, the diffracted light array generation module 200 includes a laser 210 and a diffractive optical lens 220. The laser 210 is configured to emit an initial detection light beam. The diffractive optical lens 220 is configured to convert the initial detection light beam into the diffracted light array.

Figure 3:
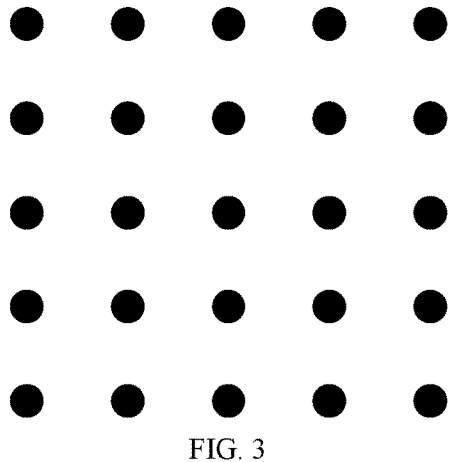
FIG. 3 is a schematic diagram illustrating a diffracted light array according to an embodiment.

In an embodiment, as shown in FIG. 3, the diffracted light array is a 5×5 light spot array. It can be understood that the more light spots are included in the diffracted light array, the more points are projected onto the sensor imaging screen 310. That is, there may be more points set for computing the curvature radius of the sample, thereby realizing a higher measurement accuracy. However, on the premise that a luminous intensity of the laser 210 is unchanged, a light intensity of each light spot obtained and converted by the diffractive optical lens 220 is inversely proportional to the number of light spots. Furthermore, in the case that the divergence angle β of the formed diffracted light array is unchanged, a distance between adjacent light spots is also inversely proportional to the number of light spots. In addition, the light intensity of the light spot and the distance between adjacent light spots can raise corresponding requirements for the measurement precision of the sensor imaging screen 310, and the higher requirement of the measurement precision is, the higher manufacturing difficulty and cost are. Therefore, a suitable diffractive optical lens 220 should be selected to generate a diffracted light array with the suitable number of light spots, thereby better balancing the relationship between the measurement accuracy and the manufacturing cost.

In an embodiment, as shown in FIG. 2, the device for measuring the curvature radius further includes a semi-reflecting and semi-transmitting lens 400 disposed between the diffracted light array generation module 200 and the sample stage 100, and an included angle between the semi-reflecting and semi-transmitting lens 400 and the sample stage 100 is 45°.

The diffracted light array passes through the semi-reflecting and semi-transmitting lens 400 and reaches the surface of the sample, and is reflected by the surface of the sample and the semi-reflecting and semi-transmitting lens 400, and then is projected on a sensor imaging screen 310 arranged to be perpendicular to the sample stage 100.

The semi-reflecting and semi-transmitting lens 400 changes an emitting direction of the reflected light array, which can prevent the laser 210 and the diffractive optical lens 220 from blocking the reflected light array, and thus a complete reflected light array on the sensor imaging screen 310 can be obtained. In this embodiment, S denotes a path length from the diffractive optical lens 220 to the surface of the sample, and H denotes a sum of a path length H1 from the surface of the sample to the semi-reflecting and semi-transmitting lens 400 and a path length H2 from the semi-reflecting and semi-transmitting lens 400 to the sensor imaging screen 310.

In an embodiment, the sample stage 100 includes a table board and a two-dimensional movement mechanism. The table board is configured to support the sample to be measured, and the two-dimensional movement mechanism is configured to drive the table board to move horizontally. The curvature radii of a preset range of the sample can be measured according to a preset measurement logic, thus measurement data of the curvature radii of multiple points of the sample can be automatically measured and obtained by setting parameters once, which can improve the operability and the flexibility of the device for measuring the curvature radius.

Figure 4:
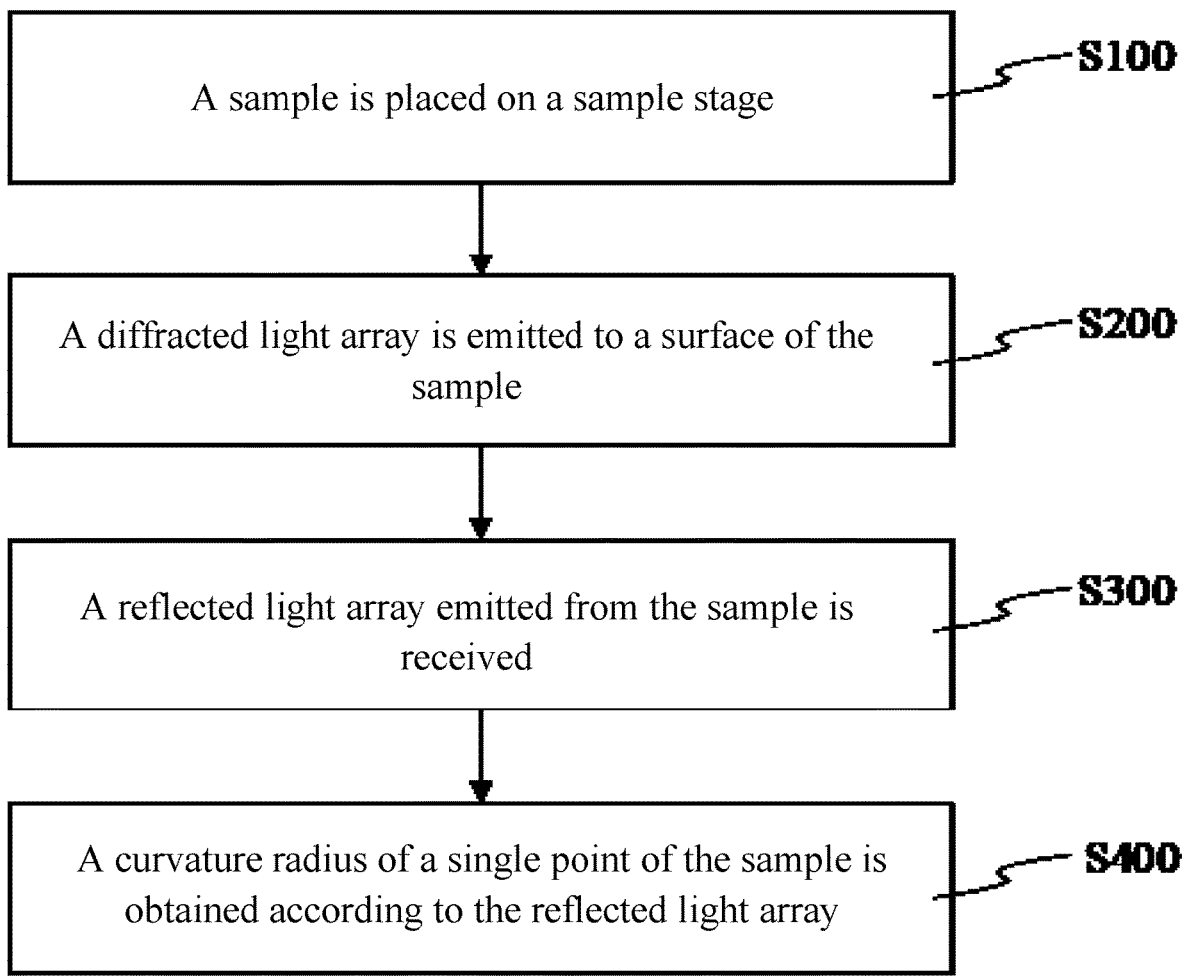
FIG. 4 is a flowchart of a method for measuring a curvature radius according to an embodiment.

As shown in FIG. 4, the technical solution of the present disclosure further provides a method for measuring the curvature radius, including following steps.

At S100, a sample is placed on a sample stage 100.

At S200, a diffracted light array is emitted to a surface of the sample.

At S300, a reflected light array emitted from the sample is received.

At S400, a curvature radius of a single point of the sample is obtained according to the reflected light array.

In an embodiment, before the sample is placed on the sample stage 100, the method further includes a step S500 of calibrating mechanical parameters of the device for measuring the curvature radius. According to the calculation formula of the curvature radius, the inherent mechanical parameters H and S of the device for measuring the curvature radius are necessary for computing the curvature radius of the sample. However, the mechanical parameters H and S may vary due to factors such as external vibrations, thereby affecting the calculation result of the curvature radius. As a result, the step of calibrating the mechanical parameters is beneficial to improvement of the accuracy of the device for measuring the curvature radius.

Figure 5:
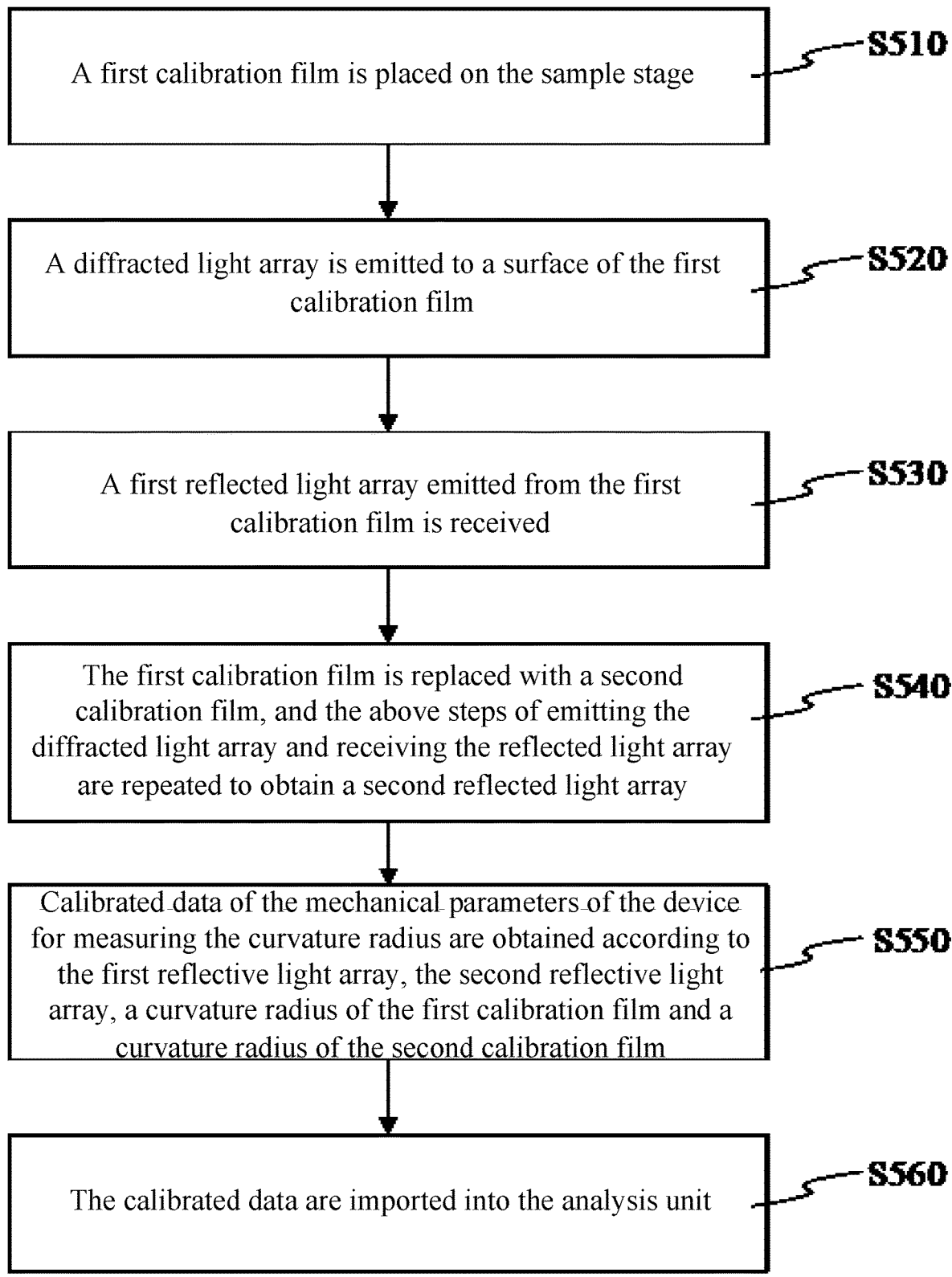
FIG. 5 is a flowchart of a step S500 of the method for measuring the curvature radius according to an embodiment.

In an embodiment, as shown in FIG. 5, the step of calibrating the mechanical parameters of the device for measuring the curvature radius includes following steps.

At S510, a first calibration film is placed on the sample stage 100.

At S520, a diffracted light array is emitted to a surface of the first calibration film.

At S530, a first reflected light array emitted from the first calibration film is received.

At S540, the first calibration film is replaced with a second calibration film, and the above steps of emitting the diffracted light array and receiving the reflected light array are repeated to obtain a second reflected light array.

At S550, calibrated data of the mechanical parameters of the device for measuring the curvature radius are obtained according to the first reflective light array, the second reflective light array, a curvature radius of the first calibration film and a curvature radius of the second calibration film.

At S560, the calibrated data are imported into the analysis unit.

In this embodiment, it is known that the curvature radius of the first calibration film is R1, the curvature radius of the second calibration film is R2, and R1 and R2 are used as known quantities and are substituted into the calculation formula of the curvature radius to solve the accurate calibrated data of H and S, thus the analysis unit can obtain the accurate curvature radius R of the sample according to the calibrated data.

Figure 6:
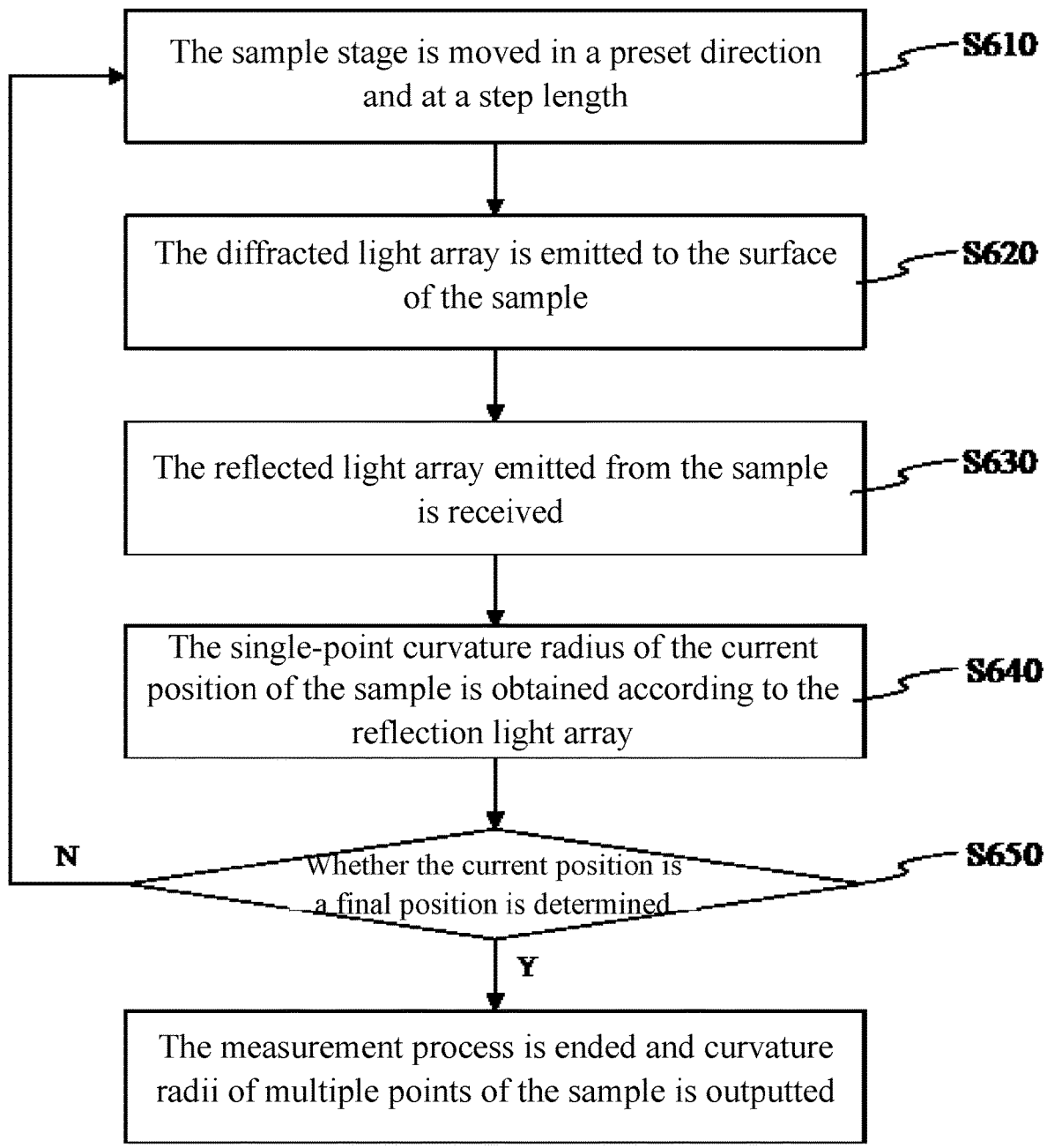
FIG. 6 is a flowchart of a method for measuring curvature radii of multiple points according to an embodiment.

In an embodiment, as shown in FIG. 6, after the step of obtaining the single-point curvature radius, the method further includes following steps.

At S610, the sample stage 100 is moved in a preset direction and at a step length.

At S620, the diffracted light array is emitted to the surface of the sample.

At S630, the reflected light array emitted from the sample is received.

At S640, the single-point curvature radius of the current position of the sample is obtained according to the reflection light array.

At S650, it is determined whether the current position is a final position; if yes, the measurement process is ended and the curvature radii of multiple points of the sample is outputted; otherwise, the steps of moving the sample stage 100, emitting the diffracted light array and receiving the reflected light array are repeated to obtain the curvature radius of a next position.

At the steps of the multi-point measurement of this embodiment, the curvature radii of a preset range of the sample can be measured according to the preset measurement logic, so that the measurement data of the curvature radii of multiple points in the sample can be automatically measured and obtained by setting the parameters once, which can improve the operability and the flexibility of the measurement of the curvature radius. Specifically, an operator may select a measurement region of the surface of the sample and set a measuring step length, then a controlling component of the two-dimensional movement mechanism may automatically plan a measurement path in the measurement region according to the measurement step length. After each single-point measurement, the two-dimensional movement mechanism may control the movement of the sample according to the measurement path until the current position is a final position in the measurement path.

In an embodiment, after the step of obtaining the curvature radii of multiple points of the sample, the method further includes a step of drawing a distribution diagram of the curvature radii of the sample according to the curvature radii of multiple points. From the distribution diagram of the curvature radii, the distribution of the curvature radii of the sample can be visually acquired and analyzed, as a result, process parameters of the thin film deposition process may be adjusted or bad samples may be discarded, thereby improving the overall production yield of the device.

It should be noted that the limitation of the steps involved in this solution, if it does not affect the implementation of the specific solution, shall not be considered to limit the order of the steps, and the step written in front can be performed first, or later, or even performed simultaneously with other steps, which should be considered to fall within the protection scope of the present disclosure, as long as the solution can be implemented.

The technical features of the above-described embodiments may be arbitrarily combined. For the sake of brevity, not all possible combinations of the technical features in the above embodiments are described. However, as long as there is no contradiction in any combination of these technical features, these combinations should be considered to be within the scope of the present disclosure.

The above-described embodiments are only several implementations of the present disclosure, and the descriptions thereof are relatively specific and detailed, but they should not be construed as limiting the scope of the present disclosure. It should be understood by those of ordinary skill in the art that various modifications and improvements can be made without departing from the concept of the present disclosure, and shall be considered to fall within the protection scope of the present disclosure. Therefore, the protection scope of the present disclosure shall be defined by the appended claims.

What is claimed is:

1. A device for measuring a curvature radius, the device comprising:
   a sample stage, configured to support a sample to be measured;
   a diffracted light array generation module, configured to generate and emit a diffracted light array to the sample; and
   a detection and analysis module, configured to receive a reflected light array emitted from the sample and to obtain a curvature radius of the sample according to a dimension of a received reflected light array,
   wherein the detection and analysis module comprises:
      a sensor imaging screen, configured to receive the reflected light array emitted from the sample and to convert an optical signal of the reflected light array into an electrical signal; and
      an analysis unit, electrically connected to the sensor imaging screen and configured to obtain the curvature radius of the sample according to the electrical signal;
   wherein an emitting direction of the diffracted light array is perpendicular to the sample stage, and the curvature radius of the sample is obtained according to a following formula:

$$R = \frac{2HS(\sec \beta)^2 \tan \beta + 2DS(\tan \beta)^2 + \sqrt{4D^2S^2(\tan \beta)^2 + [2HS(\sec \beta)^2 \tan \beta + 2DS(\tan \beta)^2]^2}}{2D}$$

wherein,

R denotes the curvature radius of the sample;
S denotes a length of a first path of the diffracted light array from the diffracted light array generation module to a surface of the sample;
H denotes a length of a second path of the reflected light array from the surface of the sample to the sensor imaging screen;
β denotes a divergence angle of the diffracted light array; and
D denotes a distance between an actual landing point and a preset landing point of the reflected light array on a detector, and D>0.

2. The device according to claim 1, wherein the length S of the first path is less than 1 m.

3. The device according to claim 1, wherein the length H of the second path is less than 1 m.

4. The device according to claim 1, further comprising a semi-reflecting and semi-transmitting lens disposed between the diffracted light array generation module and the sample stage, wherein an included angle between the semi-reflecting and semi-transmitting lens and the sample stage is 45°;
   wherein the semi-reflecting and semi-transmitting lens is configured in such a manner that the diffracted light array passes through the semi-reflecting and semi-transmitting lens, reaches a surface of the sample, and is reflected by the surface of the sample and the semi-reflecting and semi-transmitting lens, and is projected onto the sensor imaging screen perpendicular to the sample stage.

5. The device according to claim 1, wherein the sensor imaging screen comprises a CCD image sensor.

6. The device according to claim 5, wherein the sensor imaging screen has a measurement precision of 10 um.

7. The device according to claim 1, wherein the analyzing unit is a computer.

8. The device according to claim 1, wherein the diffracted light array is a 5×5 light spot array.

9. The device according to claim 1, wherein the sample stage comprises:
   a table board, configured to support the sample to be measured; and
   a two-dimensional movement mechanism, configured to drive the table board to move horizontally.

10. The device according to claim 1, wherein the diffracted light array generation module comprises:
    a laser, configured to emit an initial detection light beam; and
    a diffractive optical lens, configured to convert the initial detection light beam into a diffracted light array.

11. A method for measuring a curvature radius, applied to the device according to claim 1 and the method comprising:
    placing a sample on a sample stage;
    emitting a diffracted light array, from the diffracted light generation module, to a surface of the sample;
    receiving a reflected light array, at the detection and analysis module, emitted from the sample; and
    obtaining a single-point curvature radius of the sample according to the dimension of the reflected light array.

12. The method according to claim 11, wherein before the placing the sample on the sample stage, the method further comprises: calibrating mechanical parameters of a device for measuring the curvature radius.

13. The method of claim 12, wherein the calibrating the mechanical parameters of the device for measuring the curvature radius comprises:
    placing a first calibration film on the sample stage;

emitting the diffracted light array to a surface of the first calibration film;

receiving a first reflected light array emitted from the first calibration film;

replacing the first calibration film with a second calibration film, and repeating steps of emitting the diffracted light array and receiving the reflected light array to obtain a second reflected light array;

obtaining calibrated data of the mechanical parameters of the device for measuring the curvature radius measurement according to the first reflected light array, the second reflective light array, a curvature radius of the first calibration film and a curvature radius of the second calibration film; and importing the calibrated data into an analysis unit.

14. The method according to claim 11, wherein after step of obtaining the single-point curvature radius, the method further comprises:

moving the sample stage in a preset direction and at a preset step length;

emitting a diffracted light array to the surface of the sample;

receiving a reflected light array emitted from the sample;

obtaining a single-point curvature radius of a current position of the sample according to the reflected light array; and determining whether the current position is a final position; responsive to the current position being the final position, ending the measurement process and outputting curvature radii of multiple points of the sample; and responsive to the current position not being the final position, repeating steps of moving the sample stage, emitting the diffracted light array, and receiving the reflected light array to obtain the curvature radius of a next position of the sample.

15. The method according to claim 14, wherein after step of obtaining the curvature radii of multiple points of the sample, the method further comprises: drawing a distribution diagram of curvature radii of the sample according to the curvature radii of multiple points.

* * * * *